July 16, 1968 W. J. REINECKER ETAL 3,392,923
MULCHING MACHINE WITH FLAIL AND BLOWER
Filed Jan. 18, 1967 4 Sheets-Sheet 1

INVENTORS: WALTER J. REINECKER
DAVID J. WESTERGARD
BY Charles H. Reeth
ATTORNEY

INVENTORS: WALTER J. REINECKER
DAVID J. WESTERGARD
BY Charles H. Recht
ATTORNEY

United States Patent Office 3,392,923
Patented July 16, 1968

3,392,923
MULCHING MACHINE WITH FLAIL
AND BLOWER
Walter J. Reinecker, 1231 Martine Ave., Plainfield, N.J.
07060, and David J. Westergard, Kent Fort Manor,
Annapolis, Md. 21666
Filed Jan. 18, 1967, Ser. No. 610,083
8 Claims. (Cl. 241—56)

ABSTRACT OF THE DISCLOSURE

This invention relates to a device for spreading materials through an aimable, jointless, straight chute by means of air flow augmented by physically catapulting the material through the chute.

---

Figure 1:
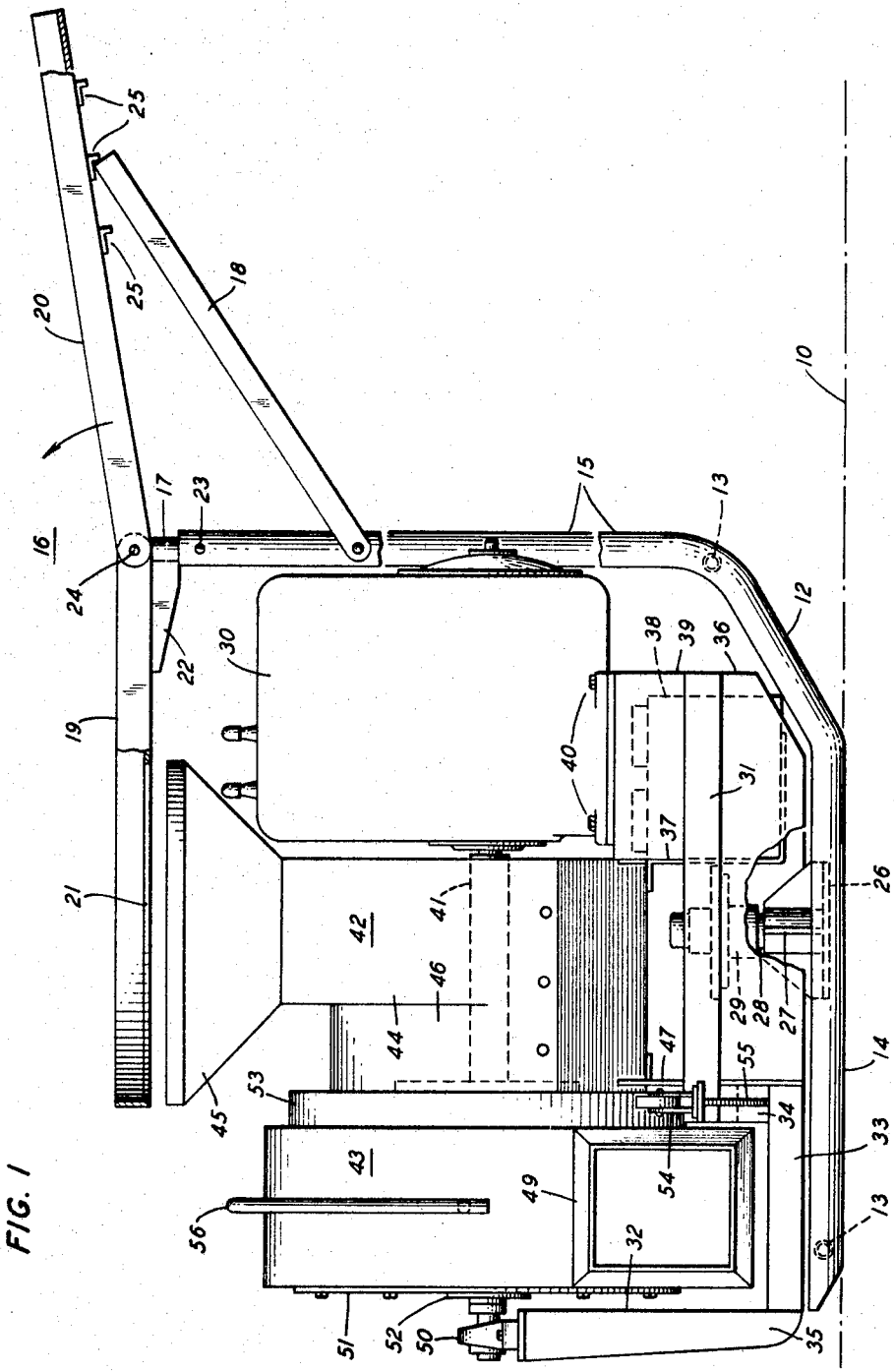

This invention relates to a device for spreading, diffusing or distributing material or substances over wide areas, and more particularly, to a device for spreading mulch, seed, hay, fertilizer, lime or other similar materials, over the ground.

During the course of building new highways, housing developments, golf courses and other large construction projects, vast areas of ground are usually stripped of vegetation and left exposed. In order to prevent erosion, control water run-off and beautify the area, machines have ben developed to spread and sow seed, fertilizer and other needed materials to cover the exposed ground with vegetation.

As a general rule, these machines develop a strong confined air stream by means of a rotating fan that is located within a stationary housing. The air stream is exhausted through a boom or spout that is made directional with respect to the rest of the machine by means of a journaled joint or other similar device. The mulch or seeding material is fed into the fan housing, through a beater chamber in some instances, where it is intermixed with the air stream. The latter carries the material through the boom where it is exhausted into the atmosphere and spread over the subject area.

The machines as described above include certain limitations and drawbacks. One of these limitations is that the design of the joint wherein the boom is attached to the machine is somewhat complicated and usually large and cumbersome in size. In addition, a considerable portion of the air stream energy is dissipated in the joint due to turbulence in the air stream caused by the change in direction of the air stream in the joint and also for other various reasons. Any projections or surface irregularities on the inside of the joint also disrupt the air stream adding to its inefficiency.

Another limitation of the machines described above is that it is necessary to rely solely upon the confined air stream to transport the materials or substances through the boom and disperse and dispense the materials. Any diminution in the effective force exerted by the air stream on the materials, results in a less efficient machine, less coverage and more expensive operation.

These factors, and others not mentioned, all tend to limit the effectiveness of the machines described above. Any decrease or diminution in the energy of the air stream results in less range for the machine.

The invention is embodied within a device that does not require a universal type joint in the boom to direct the air stream. In addition, the device does not depend solely upon the air stream to dispense or disperse the subject materials. Thus, the two major limitations or drawbacks of the prior art are overcome by the illustrative device embodying the invention.

Figure 2:
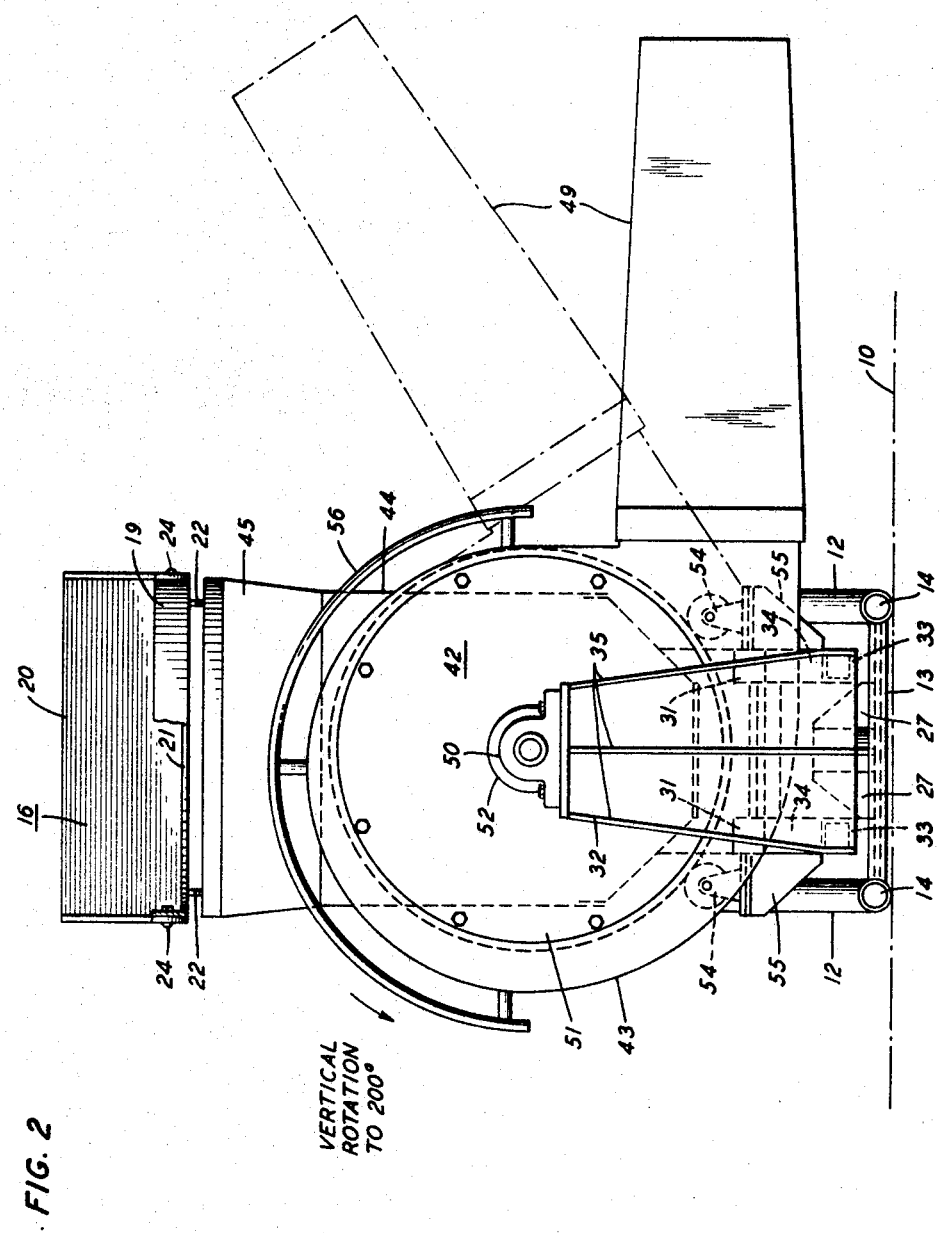
Figure 3:
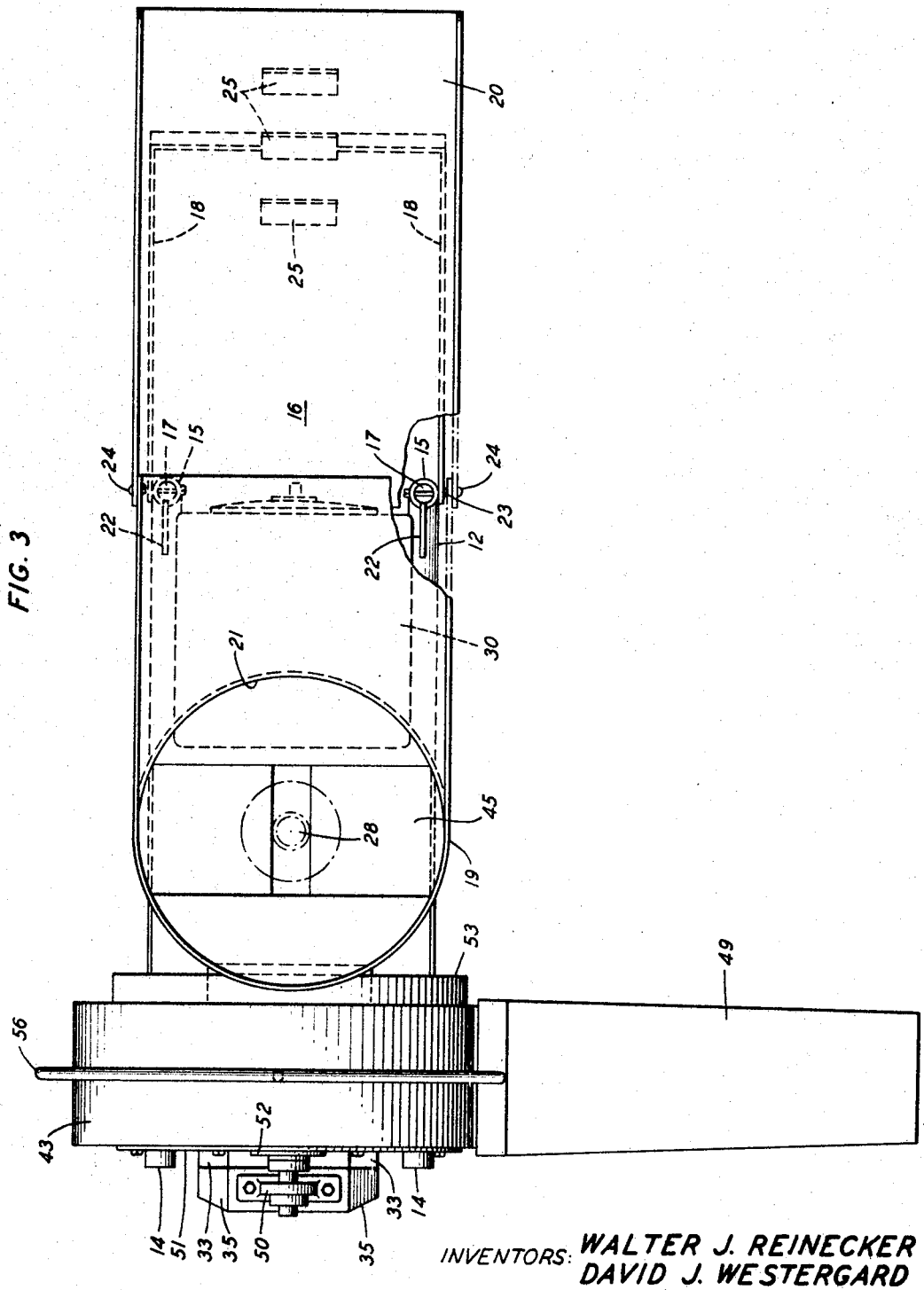
Figure 4:
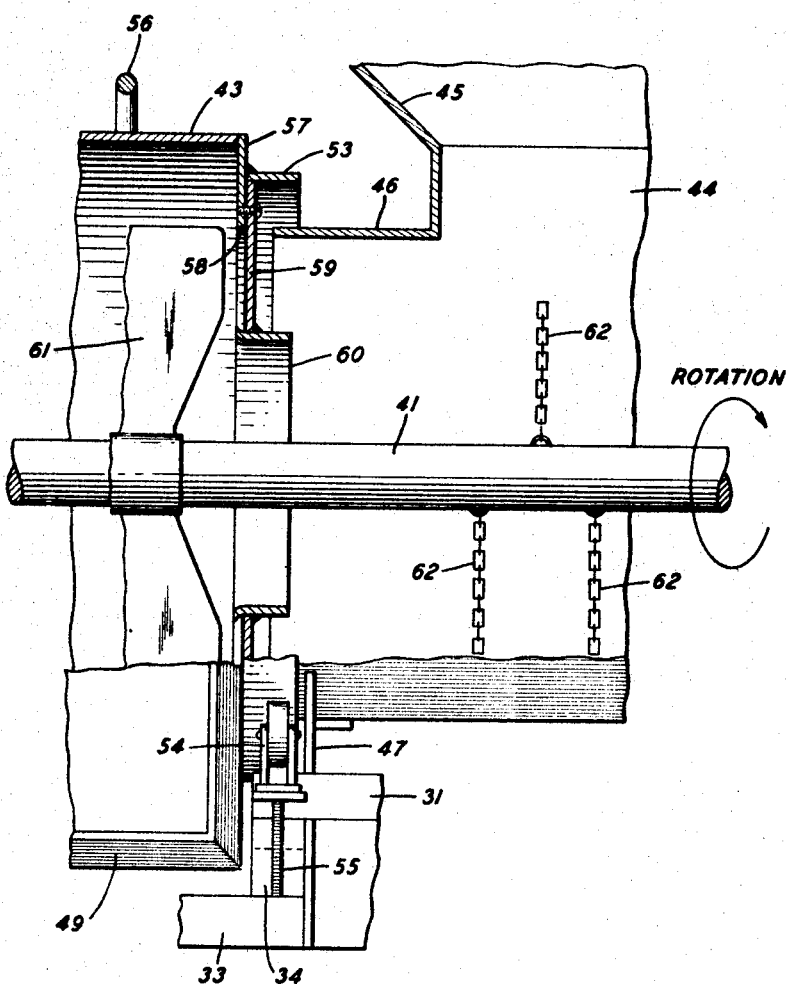

The invention will be better understood, its features and advantages more readily apparent upon the study of the following detailed description of an illustrative embodiment when read in conjunction with the drawing, in which:

FIG. 1 is a side view of the device;
FIG. 2 is an end view of the device shown in FIG. 1;
FIG. 3 is a top view of the device shown in FIG. 1; and
FIG. 4 is a section view showing the interior of the device and a rotatable joint.

As shown in the various figures, the invention is embodied within a machine that is adapted to be mounted upon the back of a truck 10. It is obvious that the machine may be mounted upon any moving platform whether it be a truck or not, or if desired, upon a stationary mounting. The machine includes a tubular basic frame that comprises two parallel skid pipes 12 that are fastened together by other tubular members 13. The skid pipes 12 each have a horizontal portion 14 and a vertical portion 15. A loading tray 16 is attached to the vertical portions 15 of the pipes 12 by means of tubular members 17 and a U-shaped support bar 18.

The loading tray 16 is comprised of a fixed loading tray 19 and an adjustable loading tray 20. The fixed loading tray 19 includes an opening 21. The tray 19 is fixed to the upper ends of the vertical portions 15 of the skid pipes 12 by means of interfitting tubular members 17 and braces 22. The tubular members 17 interfit with the portions 15 of the pipes 12. The braces 22 are rigidly fastened to the tubular members 17 which are in turn rigidly connected by means of threaded fasteners 23, pins, or the like, to the vertical portions 15. In turn, the braces 22 and members 17 are rigidly fastened, by means of welding and other like processes, to the fixed loading tray 19.

The adjustable loading tray 20 is attached to the fixed loading tray 19 by means of axles 24 which, in this instances, are comprised of bolts or threaded fasteners. On the underside of the adjustable loading tray 20, are located a plurality of spaced, parallel cleats 25. The cleats 25 are adapted to cooperate with the U-shaped support bar 18, as shown in FIGURES 1 and 3, to maintain the adjustable loading tray 20 in a desired position. From an inspection of FIG. 1, it is apparent that the inclination of the loading tray 20 may be varied and changed by bringing the U-shaped support bar 18 into contact with different cleats 25 located under the tray 20.

A support plate 26 is rigidly fastened between the horizontal portions 14 of the skid pipes 12. The support plate 26 further includes a mounting 27 in which a shaft 28 interfits. The shaft 28, in turn, interfits with a mounting and bearing support 28 (see FIG. 1).

The mounting and bearing support 29 is part of a rotatable frame upon which is mounted a motor, engine or power supply 30. The rotatable frame is comprised of two parallel beams 31 between which is rigidly secured the mounting and bearing support 29. The frame further includes a vertical end plate 32 which is attached to one end respectively of each of the beams 31 by means of two horizontal arms 33 and two perpendicular arms 34. The end plate 32 is rigidly secured to the arms 33 which, in turn, are rigidly secured to the arms 34 to form a U-shaped yoke. The plate 32 further includes stiffening ribs 35.

The positions of the arms 33 and 34 and the beams 31 with respect to each other are maintained by cross supports (not shown) and stiffener flanges 36. The flanges 36 are welded to the beams 31 and the arms 33 and 34, as shown in FIG. 1, to add strength to the frame.

The frame further includes a battery holder and support 37 that is located between the ends of the beams 31. The holder and support 37 forms a shelf upon which a battery 38 rests.

An engine mounting 39 is attached to the beams 31 adjacent to the holder and support 37. The mounting 39 is secured to the beams 31 and to the holder and support 37. The engine 30 is attached to the mounting 39 by means of threaded fasteners 40 or other like fasteners.

The device further includes a hopper 42, mixing chamber 46 and a fan housing 43. The mixing chamber 46 is a tubular or cylindrical shaped compartment located adjacent to the engine 30. The chamber 46 is mounted on the frame so that the longitudinal center line of the chamber 46 generally corresponds to the longitudinal center line of the output shaft 41 of the engine 30. The hopper 42 further includes an opening 44 and a loading funnel 45. The funnel 45 is located immediately underneath the opening 21 in the fixed loading tray 19. The funnel 45 is adapted to catch any material coming through the opening 21 and guide it through the opening 44 and into the chamber 46 of the hopper 42.

The hopper 42 is mounted upon the frame by means of the holder and support 37 and a mounting bracket 47. The support 37 fixes one end of the hopper 42 and the bracket 47 fixes the other end of the chamber 46. The support 37 and bracket 47 form a cradle in which the hopper 42 and chamber 46 rest.

The hopper 42 is interposed between the engine 30 and the fan housing 43. The housing 43 comprises a cylindrical body member 48 having a catapult chute 49 extending from a circumferential edge of the body member 48. The member 48 is located with respect to the rest of the device so that its longitudinal axis generally corresponds to the longitudinal axis of the chamber 46 and the drive shaft 41 of the engine 30.

The drive shaft 41 of the engine 30 extends through the chamber 46 and the fan housing 43. It is supported on one end by a bearing 50 and on the other end by the engine 30. The bearing 50 is fixed on top of the end plate 32.

The housing 43 includes an end cover plate 51 that encloses the body member 48 on one end. A bearing 52 is located in the center of the plate 51 and fits over the drive shaft 41. The other end of the housing 43, distant from the end cover plate 51, is rotatably mounted about the external periphery of the chamber 46. The latter includes an opening so that the interior of the chamber 46 communicates with the interior of the housing 43.

As shown in FIGURE 4, annular side plate 57 is welded to the body member 48. The plate 57 forms a base for a ring 53 that is fixed, such as by welding, to the annular plate 57. The ring 53 includes an interior opening that is substantially larger in diameter than the opening in the side plate 57. Thus, a portion 58 of the plate 57 is exposed inside the ring 53.

A second cover plate 59 is attached to the portion 58 of the plate 57, thus completing the housing 43. The plate 59 is fixed to the plate 57 by removable fasteners, such as threaded fasteners. The plate 59 further includes an orifice 60. The latter is rigidly fixed to the plate 59. The orifice 60 extends into the chamber 46 and provides a passage from the compartment 46 to the interior of the housing 43. The member 48, side plate 57, ring 53, chamber 46, cover plate 59, orifice 60 and drive shaft 41 are coaxial; their longitudinal axis being substantially coincident.

The ring 53 serves a two-fold purpose; namely, it serves as a labyrinth seal to prevent material from escaping from the chamber 46 and secondly, as a support or track for rollers 54. The rollers 54 support one end of the housing 43 and allow it to rotate about its axis which is coincident with drive shaft 41.

A handle 56 is attached to the outer circumferential edge of the housing 43 and is used to rotate the housing 43 with respect to the chamber 46.

The housing 43 is in the shape of a volute and includes a catapult chute 49 on its outer circumferential face substantially tangent to the body member 48 and the blades of the fan 61. The chute 49 is straight and includes no bends or joints.

The shape of the housing 43 is to maximize efficiency by providing two modes of transporting material through the device; namely, by means of air flow and by physically catapulting material out of the chute 49.

As shown in FIGURE 4, material enters the housing 43 through orifice 60 near the root or base of the blades of the fan 61. As the fan 61 rotates, it generates an air stream that is supplied by air entering through the orifice 60 and from the chamber 46. This supply of air also implements in carrying material through the chamber 46 into the housing 43.

As the fan 61 rotates the material travels along a course generally parallel to the blades of the fan 61 toward the outer tips of the blades and toward the inner surface of the member 48. The air stream generated by the fan 61 is directed to the atmosphere through the chute 49. As the air leaves the blades of the fan 61, it is generally turbulent in the nature. The chute 49 assists in reorganizing and directing the air stream after it leaves the fan 61. Since turbulence in the air stream results in a loss of air pressure, it is desirable to keep turbulence to a minimum.

The chute 49 as previously mentioned, is straight and has no bends, joints or other restrictions to air flow. In addition, it is located on the outer circumferential edge or tangential face of the housing 43. One advantage of locating the chute 49, as described, is that the material transported through the chute 49 is transported in two ways. First the air stream developed by the fan 61 transports the material injected into the housing 43 by carrying it through the chute 49 by virtue of air movement. Since the chute 49 has no obstructions, joints or bends, the energy of the air stream is not diminished and a more efficient utilization of the air stream energy results.

The second mode of transportation is a physical catapulting or flinging of the material out of the chute 49 by the blades of the fan 61.

The shape of the housing 43 is generally cylindrical in shape; being more particularly in the shape of a volute. The axial center line of the chute 49 is generally tangent to the outer diameter of the fan 61.

Turning of the fan 61 causes the air and material in the housing 43 to progress along the blades of the fan 61 toward the blade tips. The air has a tendency to compress and collect, along with the material, on the inner surface of the housing 43. The air stream as it leaves the fan 61 is generally turbulent in nature and becomes more laminar in flow in the chute 49. Since the chute 49 is straight and includes no joints, the air stream is not prone to turbulent loss and there is no tendency for the material to collect in any joints or on any protuberant. Thus the material is carried through the device by the air stream in the most efficient manner.

As previously described, the chute 49 is located so that its axial center line is generally tangent to the outer diameter of the fan 61. Since the material is a solid and substantially incompressible, the blades of the fan 61 act directly on the material. Thus, the fan 61 is capable of physically throwing, fling or catapulting the material out of the chute 49. Since the chute 49 includes no joint or bends, the fan 61 can catapult the material directly out of the chute 49.

In view of the above, a major advantage of the device is that its is capable of distributing material with a minimum of air stream energy lost and with a physical assist from the blades of the fan 61 in actually catapulting or flinging the material out of the chute 49.

In addition to the rotation of the housing 43, with respect to the chamber 46, previously described, the rotatable frame, engine 30, chamber 46 and housing 43 rotate as a unit about the shaft 28 in a plane horizontal to the plane of the truck 10. The shaft 28 turns in the mounting and bearing support 29, the former acting as an axle. It is, therefore, obvious that the chute 49 may be aimed in any direction by rotating the machine about the shaft 28 and by rotating the chute 49 with respect to the chamber 42.

It is further noted, that the rotation of the rotatable frame about the shaft 28 does not move the funnel 45 with respect to the opening 21, but instead the funnel 45 always remains under the opening 21.

As a further feature, small pieces of chain 62 or projections are attached to the output shaft 41 of the motor 30 in the compartment 46. The chains 62 turn with the shaft 41 and flail the material as it is introduced into the hopper 42. This breaks the material into small pieces for easier transporting through the device and better coverage of the ground.

The device is operated by loading hay, mulch or other desired materials on the adjustable loading tray 20. It is moved down the tray 20 to the fixed tray 19 where it falls through the opening 21 into the funnel 45. The material then falls into the hopper 42 and thence into the chamber 46 where it is broken up by the flailing chains 62 and moved into the housing 43. The material is then exhausted or injected into the atmosphere through the chute 49 by the air stream generated by the fan and by the physical motion of the fan blades.

Though one embodiment of the invention is shown, it is obvious that numerous modifications and changes can be made by those skilled in the art. Such changes and modifications include automating the machine so that it can be operated automatically by servo mechanisms, by programming, remotely or other like operations. These changes and modifications are within the skill of the art, this specification and the appended claims.

What is claimed is:

1. A spreading device comprising a first and second frame, said second frame being rotatable with respect to said first frame in a first plane, dispensing means mounted on said second frame and rotatable therewith, said dispensing means including exhaust means and power means, said exhaust means being joint-less and straight and rotatable with respect to said second frame in a plane perpendicular to said first mentioned plane, said power means including means for developing a flow of air through said dispensing means and said exhaust means, said flow of air transporting a material through said dispensing means and exhaust means, said means for developing a flow of air contacting said material and propelling the latter through said exhaust means, loading means mounted on said first frame, said loading means supplying said material to said dispensing means, said last mentioned means dispensing and spreading said material over the ground.

2. A device as described in claim 1 wherein said first frame is mounted upon transporting means and said first plane is a plane generally horizontal to the surface of the ground.

3. A spreading device comprising a first and second frame, said second frame being mounted upon said first frame and rotatable with respect to said first frame in a first plane, dispensing means mounted on said second frame and rotatable therewith, said dispensing means comprising chamber means and exhaust means, said exhaust means comprising a housing having a straight jointless chute extending therefrom, said chute and housing being rotatable as a unit with respect to said chamber means in a plane generally perpendicular to said first mentioned plane, loading means mounted on said first frame, said loading means supplying a material to said chamber means, and, transporting means located within said housing and aligned with said chute, said transporting means transporting said material through said chamber means into said exhaust means and from said exhaust means through said exhaust chute, said transporting means contacting said material and physically propelling said material straight out of said chute.

4. The device described in claim 3 wherein said transporting means comprises a rotating fan having a plurality of radial blades, said fan generating a flow of air through said chamber means and through said housing and out of said chute, said flow of air moving said material from said chamber means, through said housing and out of said chute.

5. A device according to claim 4 wherein said housing is generally circular in shape and slightly larger in size than the diameter of the said fan, said chute being mounted upon said housing so that the longitudinal axis of the chute is in general alignment with and tangent to the circumference of a circle described by the outermost tips of said fan blades, said blades physically contacting said material and propelling said material directly out of said chute.

6. The device described in claim 5 wherein said chamber means includes flailing means, said last mentioned means flailing and beating said material into dispersed, short lengths and pieces.

7. A spreading device comprising a first and second frame, said second frame being mounted upon said first frame and rotatable with respect to said first frame in a plane generally horizontal to the ground, said first frame mounted upon transporting means, a loading chamber and power means mounted on said second frame and rotatable therewith, said chamber being substantially cylindrical in shape and including a side and a first end, said chamber further being hollow and having a first opening in said side and a second opening in said first end, a fan housing rotatably mounted upon the outer circumference of said chamber adjacent said first end, said housing being substantially hollow, said second opening interconnecting the interior of said housing with the interior of said chamber, said housing rotating with respect to said chamber in a plane perpendicular to said first mentioned plane, a straight drive shaft extending from said power means and through said chamber and housing, a fan having a plurality of radial blades mounted upon said shaft inside said housing, said housing being in the general shape of a volute and having a straight, joint-less chute mounted upon said housing so that the longitudinal axis of said chute extends in a direction parallel to the plane described by the radial axes of said blades and said chute is generally in alignment with and tangent to a circle described by the outermost tips of said blades, loading means mounted on said first frame, said last mentioned means supplying a material into said chamber, said power means rotating said fan, said rotating fan generating a flow of air through said chamber into said housing and out of said chute, said flow of air transporting said material from said chamber into said housing and out of said chute, said rotating blades physically contacting said material and physically propelling said material straight out of said chute.

8. The device described in claim 7 wherein flailing chains are connected to said shaft in said chamber, said chains flailing and beating said material into dispersed, short lengths and pieces.

References Cited

UNITED STATES PATENTS

| | | | |
|---|---|---|---|
| 312,983 | 2/1885 | Doyle | 222—168 |
| 1,297,497 | 3/1919 | Rosenthal | 241—60 X |
| 1,461,145 | 7/1923 | Henricks | 222—160 |
| 1,476,134 | 12/1923 | Beardsley et al. | 222—160 |
| 2,975,543 | 3/1961 | Funk | 222—193 X |
| 3,015,188 | 1/1962 | Reinecker et al. | 47—9 |
| 3,293,702 | 12/1966 | Maigret | 222—168 X |

FOREIGN PATENTS

| | | |
|---|---|---|
| 683,531 | 12/1952 | Great Britain. |
| 713,846 | 8/1954 | Great Britain. |

ROBERT B. REEVES, *Primary Examiner.*

KENNETH N. LEIMER, *Examiner.*